United States Patent [19]

Karnas

[11] 4,341,489
[45] Jul. 27, 1982

[54] OFFSHORE REEF

[76] Inventor: Joe Karnas, 4843 Eastlake Rd., Sheffield Lake, Ohio 44054

[21] Appl. No.: 34,362

[22] Filed: Apr. 30, 1979

[51] Int. Cl.³ .............................................. E02B 3/06
[52] U.S. Cl. ...................................... 405/35; 405/25; 405/33
[58] Field of Search ........................ 405/21, 23, 25, 30, 405/31, 33, 34, 35; 52/604, 606

[56] References Cited

U.S. PATENT DOCUMENTS

| 1,002,161 | 8/1911 | Lambert | 405/33 X |
| 2,344,302 | 3/1944 | Harza | 405/33 X |
| 2,364,072 | 12/1944 | Houghtaling | 405/33 X |
| 2,731,799 | 1/1956 | Lange et al. | 405/35 |
| 2,755,631 | 7/1956 | Hayden | 405/34 |
| 3,210,944 | 10/1965 | Svee | 405/33 |
| 3,280,569 | 10/1966 | Wosenitz | 405/34 |
| 3,375,667 | 4/1968 | Hard | 405/33 X |
| 3,938,338 | 2/1976 | Cullen | 405/21 |
| 4,189,252 | 2/1980 | Inman | 405/33 |
| 4,225,269 | 9/1980 | Matsui | 405/33 |

FOREIGN PATENT DOCUMENTS

| 1042479 | 8/1958 | Fed. Rep. of Germany | 405/30 |
| 576047 | 5/1976 | Switzerland | 405/35 |
| 618477 | 8/1978 | U.S.S.R. | 405/33 |

Primary Examiner—David H. Corbin
Attorney, Agent, or Firm—Maky, Renner, Otto & Boisselle

[57] ABSTRACT

An offshore reef assembly having rows of reef members of concrete or similar material with the configuration of each of the reef members providing inclined side faces arranged in grooves and ribs. The reef members may be formed by stacking blocks in the form of frustums of pyramids or cones. The interaction of the inclined side faces of the adjacent reef members with the vertically moving water caused by waves dissipates kinetic energy of the water and results in the deposition of sand and particulates on the bottom around the reef assembly.

9 Claims, 7 Drawing Figures

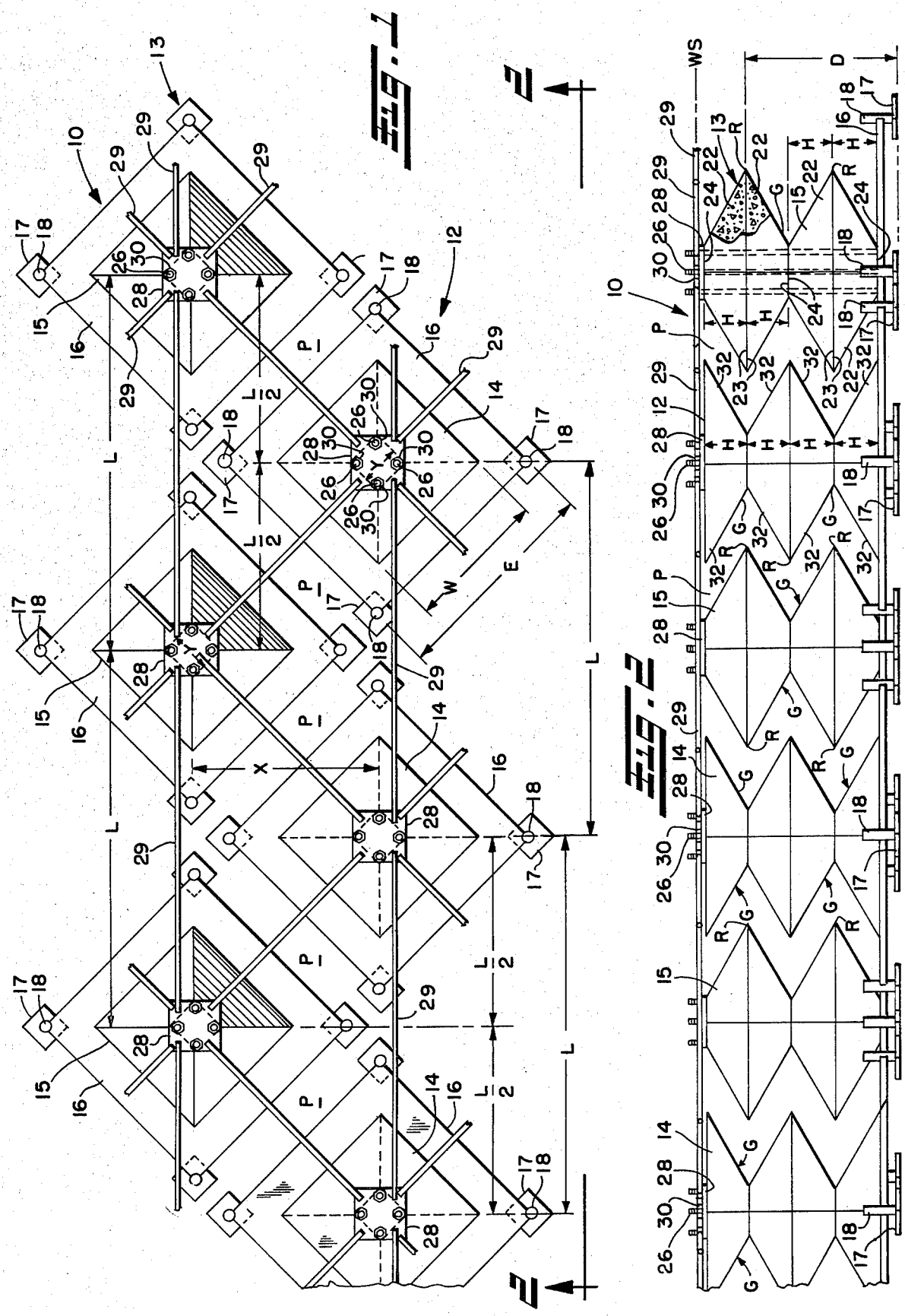

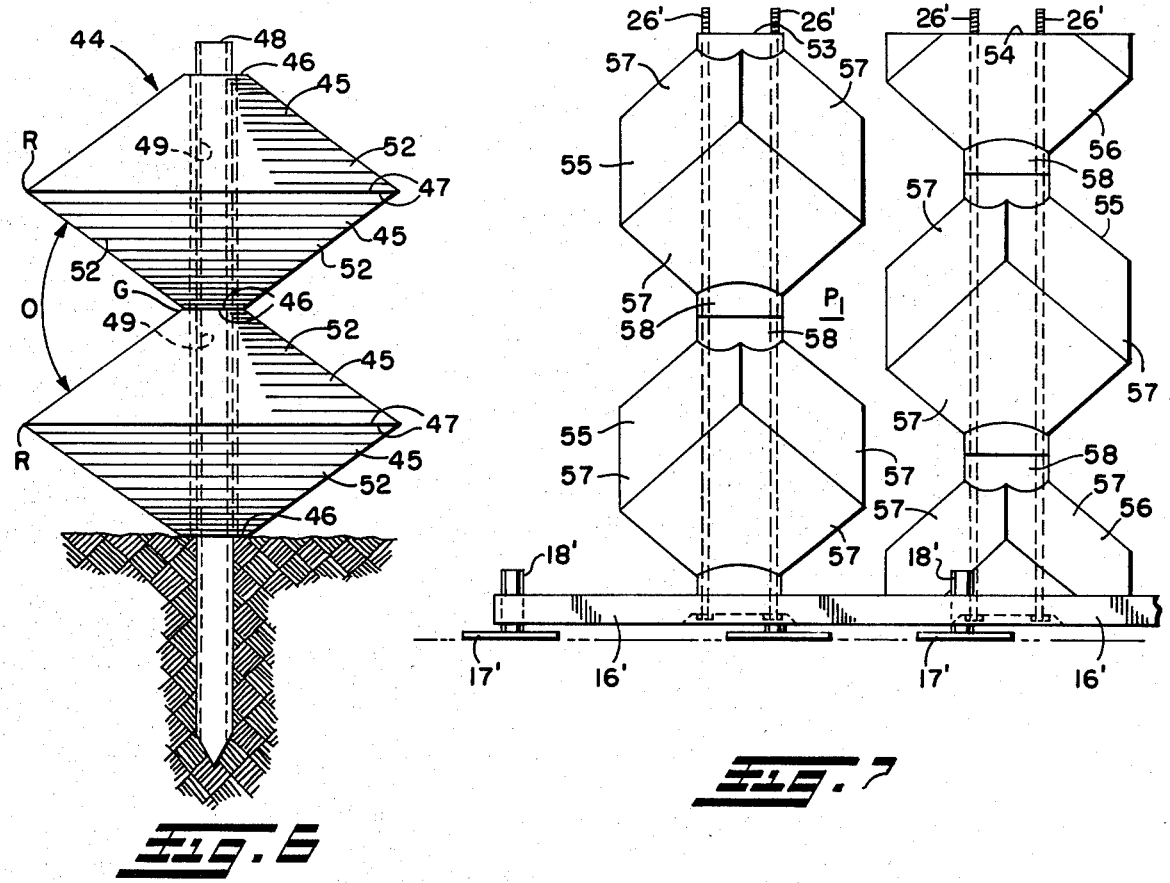

OFFSHORE REEF

This invention relates to a method and apparatus for attenuating waves in water and especially to an offshore mechanical reef which provides beach accretion and nourishment.

Heretofore breakwaters have been built of concrete walls or rock at offshore positions to prevent erosion of the shore. Alternative constructions include mechanized reefs having stepped deflector panels, frame and screen structure, breakwaters faced with concrete block, hollow blocks for positioning on the bottom, grooved bars for stacking on their sides, vertical pillars with rotatable vanes or crossbars, triangular bodies with legs for interconnecting with other triangular bodies, interconnected stacked frames or hollow blocks anchored to the bottom by pipes. Although these other reef constructions have been proposed, the need still exists for an effective offshore reef assembly which can be made and assembled at a reasonable cost.

It is, therefore, an object of this invention to provide a reef construction in which the reef member absorbs energy generated by the vertical movement of the water in both up and down directions.

Another object is to provide a reef member configuration with side faces inclined to the horizontal.

A further object is to provide a reef member formed by joining together blocks in the shape of frustums of pyramids or cones.

A still further object is to provide a reef assembly in which vertically positioned reef members are arranged in rows with the reef members of one row being in staggered positions with relation to the reef members of an adjacent row so that the inclined side faces of the reef members interact with the vertically moving water to absorb the energy of the waves and cause sand and other particulate matter to be deposited around the reef members.

Another object is to provide a reef assembly with the reef members connected together.

A further object is to provide a method of attenuating waves by diverting the downwardly and upwardly moving water in the vertical zones of the wave troughs and crests into horizontal movement by the interaction of the inclined side faces of the reef members with the water at different levels.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

In the annexed drawings:

FIG. 1 is a plan view of part of a reef assembly embodying the invention showing the tie bars broken away.

FIG. 2 is a side elevation of the reef assembly taken from the plane of line 2—2 in FIG. 1 with one of the reef members partially sectioned.

FIG. 6 is a side elevation, partially in section, of another modification in which the reef member is formed of stacked blocks having the shape of frustums of cones mounted over a steel piling driven in the bottom.

FIG. 7 is an enlarged side elevation like FIG. 2 of still another modification showing reef members in adjacent rows of the reef assembly with the base pad of one of the reef members partially broken away.

Referring to FIGS. 1 and 2, a part of a mechanical reef assembly 10 is shown mounted on a bottom surface 11 of a lake or other body of water. Preferably, the reef assembly has two or more rows 12 and 13 of elongated reef members 14 and 15, respectively, assembled offshore parallel to the shoreline.

Figure 3:
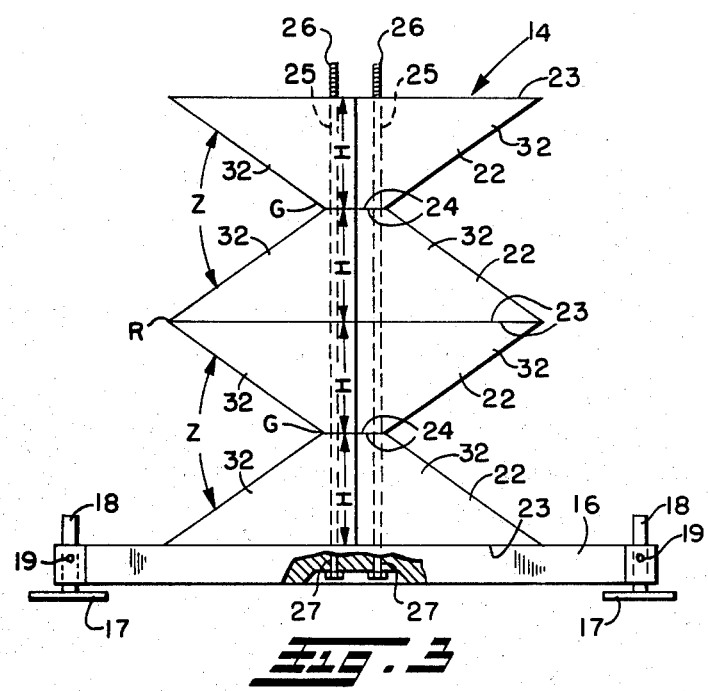
FIG. 3 is an enlarged side elevation of one of the reef members of the reef assembly shown in FIGS. 1 and 2 in which the reef member is formed of stacked blocks having the shape of frustums of pyramids and the base pad is partially broken away to show the tie rods.

Referring to FIG. 3, each of the reef members 14 may include a supporting structure such as a pad 16 of concrete or other suitable material. Corner feet 17 may be adjustably mounted on rods 18 extending through holes in the pad 16 with pins 19 or other suitable means to adjust the vertical position of the feet so that the pad may be mounted in a generally horizontal position. Blocks 22 of concrete or other suitable material are stacked on the pad 16 to form the elongated reef member 14. Each of the blocks 22 is formed in the shape of a frustum of a pyramid with a base surface 23 and a top surface 24. As shown in FIG. 3, the base surface 23 of one of the blocks 22 rests on the pad 16. A second one of the blocks 22 is stacked on top of the first-mentioned block with the top surfaces 24 of the first and second blocks in engagement. The second and third blocks are stacked with the base surfaces 23 in engagement to form a modified octahedron. On top of the third block 22 is stacked a fourth block with the top surfaces 24 of the two blocks in engagement.

At least one opening such as hole 25 extends longitudinally through central longitudinal portion of the reef member 14 for receiving an elongated supporting member such as a tie rod 26 which also extends through an aligned opening 27 in the pad 16. In the embodiment shown in FIG. 3, four holes 25 are provided through the reef members 14 and the pad 16 for receiving four tie rods 26.

At the top of the reef member 14, a cap 28, shown in FIGS. 1 and 2, having aligned holes for receiving threaded ends of the tie rods 26 is positioned over the base surface 23 of the uppermost fourth block 22. Nuts 30 are threaded on the ends of the tie rods 26 to hold the blocks 22 and pad 16 together.

As shown in FIGS. 1 and 2, each of the reef members 14 and 15 has a cap 28 and each of the caps is connected to other caps by tie bars 29 providing a connecting structure which connects the reef members 14 and 15 in rows 12 and 13. These tie bars 29 may also connect the reef members 14 and 15 to other rows of reef members (not shown) when additional rows are desirable.

Referring to FIGS. 1 and 2, the dimensions and arrangement of the reef members 14 and 15 vary indirectly with relationship to the design depth D of the water shown in FIG. 2. In the preferred embodiment shown, this depth D is approximately six feet and the width W of the block 22 at the base surface 23 is approximately six and one-half feet. The width Y at the top surface 24 is approximately two feet. The height H of each of the blocks 22 is approximately two feet making a total height of the reef member 14 above the pad 16 of approximately eight feet. This is also the height of the design water surface indicated by chain-dotted lines and by the designation WS in FIG. 2. The pad 16 has a width E of approximately ten feet.

The leveling legs or feet 17 supported by rods 18 have a configuration which may be varied to conform to the load-carrying capacity of the lake or ocean bottom 11. As shown in FIG. 1, the reef members 14 in row 12 are spaced from center-to-center a distance L of approximately eighteen feet. Likewise, the reef members 15 of row 13 are spaced a distance L of approximately eighteen feet from center-to-center. The reef members 14 and 15 are arranged in a staggered relationship so that, measured in a longitudinal direction, the center of the reef members 14 are spaced a distance L/2 of approximately nine feet from the center of the reef members 15. In this embodiment the rows 12 and 13 of reef members are spaced apart a distance X measured from centerline-to-centerline of the rows which is approximately nine feet.

As shown in FIGS. 2 and 3, the elongated reef member 14 has a variable width transversely of the member with the side faces 32 being inclined to the horizontal at an angle of approximately 42 degrees. This provides an angle Z between the diagonal edges of the blocks 22 of approximately 75 degrees. It is understood that these dimensions which are suitable for a design depth D of approximately six feet may be varied without departing from the invention. The positioning of the tie bars 29 may also be varied to provide override impact load distribution.

The blocks 22 as well as the others illustrated may be made by pouring concrete into forms having the respective shape. This may be done at a low cost by having the forms located at a prefabricated or readymix concrete manufacturing plant so that any concrete left over may be poured in the forms for the blocks.

Referring to FIG. 2, the reef member 15 has the same general construction as that described above for reef member 14; however, the blocks 22 are stacked on the pad 16 in a different arrangement. The top surface 24 of the first block 22 is seated on the pad 16 and the base surfaces 23 of the first and second blocks 22 are in engagement to form a modified octahedron. A third block 22 is stacked on top of the second block 22 with the top surfaces 24 of the second and third blocks in engagement. Then a fourth block 22 is stacked on top of the third block with the base surfaces 23 of these blocks in engagement to form a second modified octahedron. As described for reef member 14, tie rods 26 extend through holes in the pad 16 and four blocks 22 with threaded ends extending upwardly through the caps 28 where nuts 30 are threaded on the ends of the tie rods to hold the reef member 15 together. It will therefore be seen that the reef members 14 and 15 have variable widths with the side faces 32 being inclined to the horizontal. The resulting configuration has grooves G with V-shaped cross sections vertically spaced from ribs R having V-shaped cross sections. As shown in FIGS. 1 and 2, the grooves G of reef members 14 are at a different elevation than the grooves G of reef members 15. Furthermore, the grooves G of the reef members 14 in row 12 are at substantially the same level as the ribs R of the reef members 15 of row 13 so that the inclined side faces 32 of the reef members in the adjacent rows 12 and 13 define a passage P therebetween.

Figure 4:
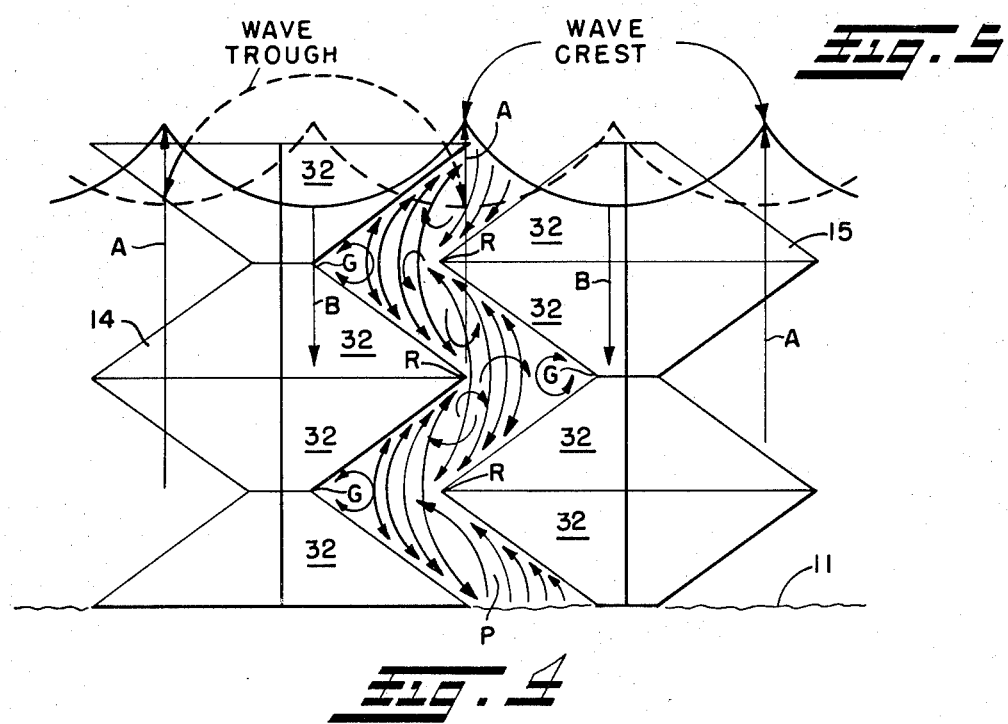
FIG. 4 is an enlarged diagramatic view like FIG. 2 showing the relationship of the reef members to each other and to the waves, the arrows indicating the movement of the water as it is deflected by the inclined side faces of the reef members.

Referring to FIG. 4, the vertical water movement of the waves at the location of the reef assembly 10 is diagramatically illustrated by arrows A indicating the upward movement of the water and by arrows B indicating the downward movement of the water which is caused by the wave, shown in full lines, at a certain time. Dotted lines indicate the position of the waves at an earlier or later time. As shown, the reef members 14 and 15 in rows 12 and 13 have inclined side faces 32 in opposing relationship forming the passage P between the reef members. The downwardly and upwardly moving water, indicated by letters A and B, in the vertical zones of the wave troughs and crests is deflected by the inclined side faces 32 of both the reef members 14 and 15. As indicated by the arrows in the passage P, the water spins, whirls and moves horizontally as well as up and down in the passage between the inclined side faces 32. This results in the kinetic energy of the water being dissipated by this turbulence so that the quantity of sand and other particulate matter which can be transported by the water is reduced. Consequently, sand and particulate matter will be deposited on the bottom surface 11 between the reef members 14 and 15 along the rows 12 and 13.

The reef members 14 and 15 are preferably assembled and installed at the site where the reef assembly 10 is to be located. The blocks 22 are transported separately to the site as are the pads 16 and tie rods 26. These parts are assembled to form the reef members 14 and 15 which can then be placed in position on the ocean or lake bottom 11. The feet 17 on the pads are adjusted to position the reef members 14 and 15 in a generally vertically position with the pads being generally horizontal. The tie bars 29 and caps 28 are secured to the reef members 14 and 15 by nuts 30 and the reef assembly is in a position to attenuate the waves and provide accretion and nourishment of the shore.

Figure 5:
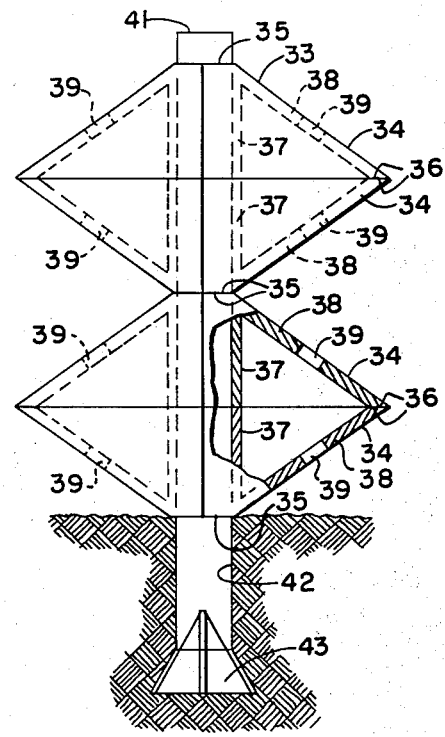
FIG. 5 is a side elevation of a modification, partially in section, in which the stacked members are hollow and mounted over a post set in a bored hole in the bottom of a lake or other body of water.

Referring to FIG. 5, a modification is shown which is especially desirable for deep water use. The same general configuration described hereinabove for the reef members 14 and 15 is followed for the reef member 33 of this embodiment. Each of the blocks 34, which may be of concrete or other suitable material, are in the form of a frustum of a pyramid with a top surface 35 and a base surface edge 36. Each of the blocks 34 is hollow with a central longitudinal portion in the form of a tube 37 and inclined side faces having walls 38 containing openings 39 for the passage of water into the hollow blocks to serve as ballast and thereby compensate for the difference between the weight of a solid concrete block and the hollow block. The blocks 34 are stacked in a similar configuration to the blocks 22 of reef member 15; however, it is understood that the blocks may also be stacked in the configuration of reef member 14 so that adjacent rows of the reef members 33 can be spaced and arranged to provide turbulence and dissipation of kinetic energy of the water as is provided by the reef assembly 10. As shown in FIG. 5, the blocks 34 of the reef member 33 are stacked over a post 41 extending through the tubes 37 of the blocks and into a hole 42 bored in the lake or ocean floor for stability. A base expander 43 or other suitable apparatus may be provided to retain the post 41 in the bored hole 42.

Referring to FIG. 6, another modified reef member 44 which is universal and nondirectional is shown. The reef member 44 is formed of blocks 45 of concrete or other suitable material with each of the blocks being generally in the shape of a frustum of a cone with a top surface 46 and a base surface 47. As shown, the blocks 45 are stacked over an elongated supporting member such as a steel piling 48 extending through a longitudinally extending opening or hole 49 in each of the blocks. The piling 48 is then driven through organic or other unstable soil conditions to a load-bearing depth.

The blocks 45 of the reef member 44 are stacked in a configuration similar to the configuration of reef members 15 described hereinabove; however, because of the conical nature of these blocks, it is not necessary to align the edges. Also, the grooves G and ribs R have the same depth and diameter at all positions around the central longitudinal portion of the reef member 44. The size of the blocks 45 may also be subtantially the same as the blocks 22 of reef members 14 and 15 and the angle O between side faces 52 of the blocks 45 is approximately 75 degrees.

Referring to FIG. 7, another modification is shown which is especially adapted for shallow water in which reef members 53 and 54 may be substituted for reef members 14 and 15 in the reef assembly 10 shown in FIGS. 1 and 2. These reef members 53 and 54 have pads 16' with leveling legs or rods 18' and feet 17' through which tie rods 26' extend to hold the blocks 55 and 56 of the reef members in a stacked relationship.

The reef member 53 is formed by stacking two blocks 55 one on top of the other. Each of these blocks 55 is in the shape of a cube with a cylindrical portion 58 extending diagonally from one corner to an opposite corner providing a plurality of side faces 57 which are inclined to the horizontal. The reef member 54 is made up of one block 55 stacked between two blocks 56 having a shape of a cube which has been cut in half on the diagonal plane perpendicular to the cylindrical portion 58 extending diagonally between opposite corners of the cube. The reef members 53 and 54 may be covered with caps and connected together by tie bars in an offshore reef configuration similar to that shown in FIGS. 1 and 2. Likewise, a passage P1 will be formed between the rows of reef members 53 and 54 through which the downwardly and upwardly moving water in the vertical zones of the wave troughs and crests will be deflected similar to the motion shown in FIG. 4. The blocks 55 are generally of a cubic shape with dimensions not over three feet in width, height and length. As stated heretofore, the reef members 53 and 54 of this configuration may be made of solid concrete cubes or parts of cubes and are particularly effective for reef assemblies located where the depth of the water does not exceed ten feet.

While certain representative embodiments and details have been shown for the purpose of illustrating the invention, it will be apparent to those skilled in the art that various changes and modifications may be made therein without departing from the invention.

The embodiments of the invention in which an exclusive property or privilege is claimed are defined as follows:

1. An offshore reef assembly comprising a substantially vertical support, and a plurality of reef members mounted on said vertical support in stacked fashion, each reef member having a substantially central vertical opening for receiving said vertical support, each of said reef members having side faces which side faces are inclined to the horizontal and vertical to absorb and dissipate the energy of water moving past said reef members, each reef member stacked on said vertical support being arranged so that the inclined side faces of vertically adjacent reef members form laterally facing alternating ribs and grooves of generally horizontally extending V-shape cross section, and a plurality of vertical supports each with reef members stacked thereon arranged in a row, the side faces of the reef members in adjacent stacks being horizontally spaced to allow water to move between and past the side faces of the adjacent stacks of reef members.

2. An offshore reef assembly as set forth in claim 1 including a second row of horizontally spaced vertical supports each with reef members stacked thereon arranged parallel to and spaced from the first mentioned row, the stacked reef members of one of said rows being positioned between the stacked reef members of the adjacent row to provide a staggered arrangement with passages through the stacked reef members through which the water passes.

3. An offshore reef assembly as set forth in claim 2 wherein the ribs formed by the stacked reef members in one row are at generally the same horizontal elevation as the grooves formed by the stacked reef members in the other row, and vice versa.

4. An offshore reef assembly as set forth in claim 2 including means interconnecting the vertical supports of adjacent stacked reef members.

5. An offshore reef assembly as set forth in claim 1 wherein said stacked reef members comprise blocks of concrete.

6. An offshore reef assembly as set forth in claim 5 wherein said blocks are in the form of a frustum of a pyramid stacked base-to-base or apex-to-apex.

7. An offshore reef assembly as set forth in claim 5 wherein said blocks are in the form of a frustum of a cone stacked base-to-base or apex-to-apex.

8. An offshore reef assembly as set forth in claim 5 wherein said blocks are in the form of a cube having one corner and an opposite corner stacked so that said one corner extends upwardly and said opposite corner extends downwardly.

9. An offshore reef assembly as set forth in claim 5 wherein said blocks are hollow and adapted to be filled with water.

* * * * *